United States Patent

[11] 3,554,224

| [72] | Inventors | Colin John Kirk;<br>Reginald John Bailey, Twickenham,<br>Middlesex, England |
|---|---|---|
| [21] | Appl. No. | 841,081 |
| [22] | Filed | July 11, 1969 |
| [45] | Patented | Jan. 12, 1971 |
| [73] | Assignee | Martonair Limited<br>Twickenham, England |

[54] FLUID DISTRIBUTION VALVE
10 Claims, 4 Drawing Figs.

[52] U.S. Cl. .................................................. 137/555,
137/625.11, 137/625.19; 251/230
[51] Int. Cl. ...................................................... F16k 37/00,
F16k 11/02, F16k 31/53
[50] Field of Search ......................................... 137/555,
553, 556, 627, 556.3, 556.9, 559, 625.11, 615.19;
251/230

[56] References Cited
UNITED STATES PATENTS

| 2,477,025 | 7/1949 | Weitzen ........................ | 137/555 |
| 2,700,984 | 2/1955 | Gleasman ..................... | 137/625.11 |
| 2,827,924 | 3/1958 | Towler et al. ................. | 137/625.11 |
| 2,964,061 | 12/1960 | Rawson et al. ................ | 251/230X |
| 3,246,667 | 4/1966 | Pemberton .................... | 137/625.11X |

Primary Examiner—Henry T. Klinksiek
Attorney—Mawhinney & Mawhinney

ABSTRACT: A fluid distribution valve for use, for example, in a control circuit for controlling the machine elements of a machine tool, includes a spindle supporting a rotor. Two passages in the spindle communicate with respective annular galleries between the rotor and spindle and two series of ports are arranged in a circle about a nonrotary member. The two series of ports communicate with the respective galleries through passages in the rotor, and the rotor is rotated by indexing means in increments to connect the spindle passages with different ports in the respective series of ports.

INVENTORS
COLIN JOHN KIRK, &
REGINALD JOHN BAILEY

BY

ATTORNEY

FLUID DISTRIBUTION VALVE

The invention relates to a fluid distribution valve and particularly, but not exclusively, to a distribution valve for controlling a pneumatic circuit as taught in our patent application Ser. No. 841,080. Air distribution valves in which a rotor is utilized to distribute compressed air from a compressed air supply passage to any one of a series of distribution ports is already down. However, our aforesaid patent requires two fluid distribution valves to be indexed in unison—an object of the present invention is to provide a single fluid distribution valve which will distribute fluid under pressure from two independent fluid supply passages to respective series of distribution ports.

According to the invention a fluid distribution valve includes a spindle supporting a rotor, a first passage formed in the spindle and communicating with a first annular gallery defined between the spindle and the rotor, a second passage formed in the spindle and communicating with a second annular gallery defined between the spindle and the rotor and axially spaced from the first annular gallery, sealing means arranged to inhibit the leakage of fluid from the two annular galleries between the rotor and the spindle, a nonrotary member defining first and second circular series of spaced ports, a first passage formed in the rotor and communicating between the first annular gallery and any selected port of the first series, a second passage formed in the rotor and communicating between the second annular gallery and any selected port of the second series, further sealing means arranged operatively between the rotor and the nonrotary member for inhibiting fluid leakage from the first and second rotor passages between the rotor and the nonrotary member, and indexing means for rotating the rotor relatively to the nonrotary member in angular increments for connecting the first and second spindle passages respectively to different ports in the first and second series.

The nonrotary member may have a face formed normal to the rotational axis of the rotor, the first and second series of said ports are formed in the face of the nonrotary member such that each series is arranged around a notional circle of different diameter struck about the rotational axis of the rotor, the rotor has a face corresponding with the face of the nonrotary member, the said first and second rotor passages lead to the face of the rotor at radial positions corresponding respectively with the first and second series of ports, and the further sealing means is carried by the rotor and is biased into sealing engagement with the face of the nonrotary member. Preferably the further sealing means includes an annular sealing plug for each of the first and second rotor passages, each annular sealing plug has its external cylindrical surface sealingly supported from the rotor for axial movement towards the face of the nonrotary member, and each of the rotor passages is arranged to communicate through its respective annular sealing plug with the selected port of the corresponding series such that the prevailing fluid pressure will act on the annular face of the annular sealing plug that is remote from the nonrotary member whereby to urge the annular sealing plug into sealing engagement with the face of the nonrotary member. Compression coil springs are desirably arranged to react between the rotor and the annular sealing plugs whereby to increase the force urging the annular sealing plugs into sealing engagement with the face of the nonrotary member.

A spring means may be arranged to urge the rotor axially into engagement with the face of the nonrotary member. Preferably the spring means is a compression coil spring reacting between the rotor and the spindle. The spindle is desirably supported by the said nonrotary member. The first and second spindle passages may be defined by respective axial bores formed from opposite ends of the spindle.

An aperture may be formed through the nonrotary member in a significant position relatively to the first and second series of ports such that a different portion of an annular zone of the rotor will be visible through the aperture according to the indexed position of the rotor, and the annular zone of the rotor is marked in at least one significant position relatively to the first and second rotor passages.

A ratchet may be rotatively fast with the rotor for moving the rotor through its indexed positions, a pawl is arranged for indexing the ratchet, and a fluid-operable actuator is arranged for reciprocating the pawl such that each reciprocation will provide one indexing movement. Preferably the fluid-operable actuator is arranged to reciprocate the pawl whenever a fluid pressure signal is delivered to the first spindle passage from a selected port in the first series. Preferably said first spindle passage is supplied with fluid pressure through a restrictor means and said first series of ports are connected to respective sensing means which, when actuated whilst connected by said first rotor passage to said first spindle passage, will produce said fluid pressure signal. In the latter case at least one of the ports in said first series may be connected to a sensing means which is already actuated when the first rotor passage is connected to it whereby the fluid pressure signal produced by it merges with and cannot be distinguished from the preceding fluid pressure signal which caused the rotor to be indexed to the position in which the first rotor passage was connected to the said one port, and the indexing action of the fluid-operable actuator is arranged to operate valve means to cause an interruption between said preceding fluid pressure signal and the fluid pressure signal produced by the sensing means connected to said one port whereby these signals will be distinctly separated so that the fluid-operable actuator will repeat index the rotor as soon as the first rotor passage is connected to said one port. Preferably the valve means is a slide valve which is operated as the pawl approaches the end of its indexing movement, and the sensing means connected to said one port is a detector hole which is permanently blocked.

According to a further aspect of the invention, a fluid-operable motor may comprise a fluid distribution valve in which all of the sensing means connected to the first series of ports are blocked detector holes whereby the rotor will be rotated continuously in increments by the pawl. Preferably all of the sensing means are blocked detector holes.

The invention is now described, by way of example only, with reference to the accompanying drawings, in which.

Figure 1:
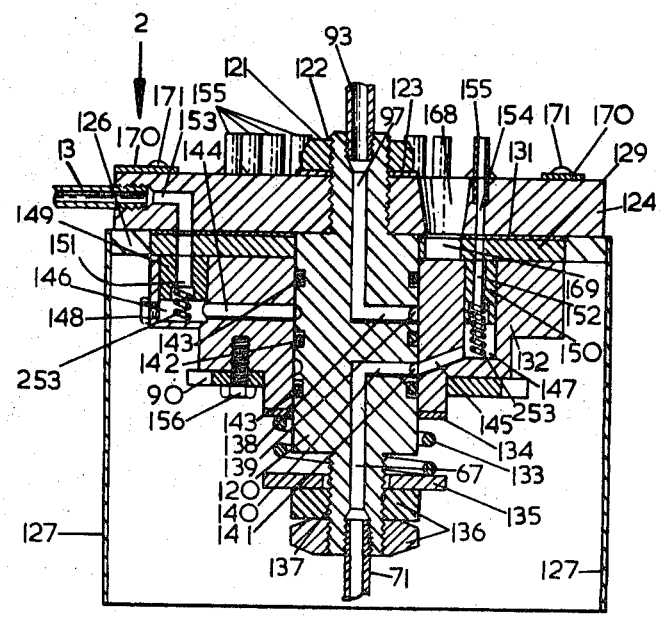
FIG. 1 is a section through a fluid distribution valve taken along the section 1–1 in FIG. 2.
Figure 2:
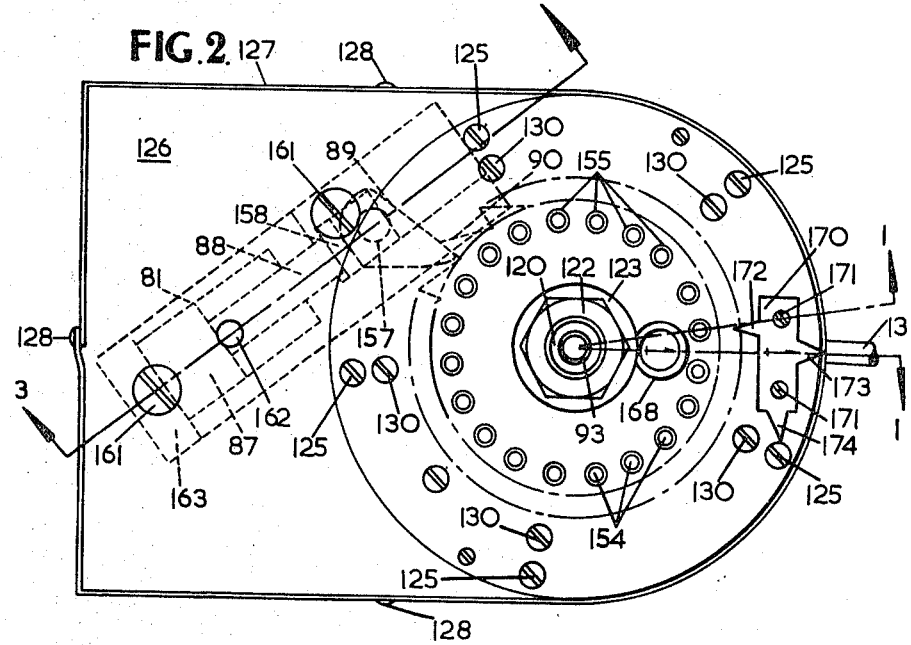
FIG. 2 is a plan view of the fluid distribution valve as if taken along the arrow 2 in FIG. 1.
Figure 3:
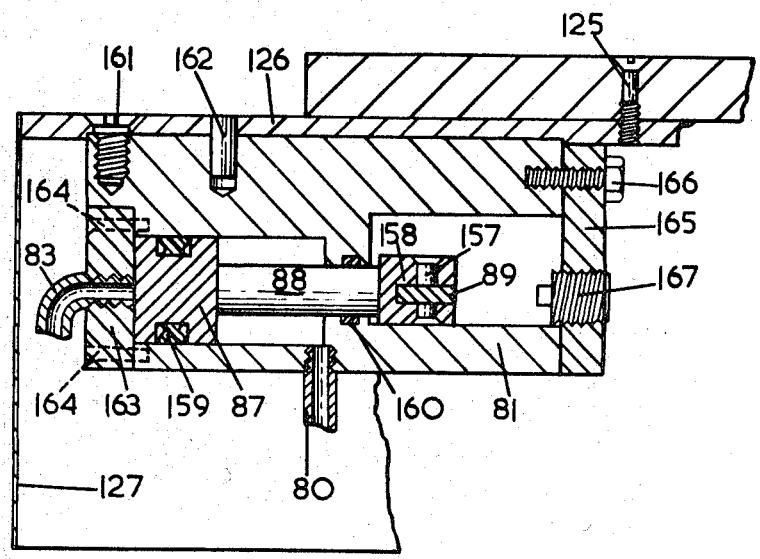
FIG. 3 is a scrap section taken along the section line 3–3 in FIG. 2.

With reference to FIGS. 1 to 3, a spindle 120 has its top end as seen in FIG. 1 secured by screw threads 121, a nut 122 and an intervening washer 123 to a nonrotory casing 124. The latter is secured by an outer ring of six screws 125 to a bracket 126 which supports a skirt 127 of sheet metal, for shrouding the moving parts, by means of a number of peripherally arranged screws 128. A brass-wear plate 129 lies in a circular aperture formed in the bracket 126 and is secured to the nonrotary casing 124 by an inner ring of screws 130 with an intervening paper gasket 131. A rotor 132 is journaled directly on the spindle 120 and is urged towards the wear plate 129 by a compression coil spring 133 which reacts between a thrust washer 134 abutting the rotor 132 and a washer 135 which bears against a pair of lock nuts 136 engaging screw threads 137 at the foot of the spindle 120 so that the load applied by the spring 133 can be adjusted by manipulating the lock nuts 136.

A first air supply line 93 is screwed into the top of the spindle 120 and communicates with an axial passage 97 which leads through a radial passage 138 into an annular gallery 139 formed in the periphery of the spindle 120. A second air supply line 71 is screwed into the bottom of the spindle 120 and communicates with an axial passage 67 which leads through a radial passage 140 into an annular gallery 141 which is also formed in the periphery of the spindle 120 but is axially spaced from the gallery 139. The galleries 139 and 141 are isolated from each other by means of an intermediate sealing ring 142 and leakage from the galleries 139 and 141 between the spindle 120 and the rotor 132 is inhibited by two further sealing rings 143.

The rotor is formed with two substantially radial passages 144 and 145 which lead respectively from the galleries 139 and 141 to bores 146 and 147 which are parallelly spaced from the axis of rotation of the rotor 132 and are arranged such that the radial distance between the bore 146 and the rotational axis of the rotor is greater than the radial distance between the bore 147 and the rotational axis of the rotor. The passage 145 is slightly inclined so that it can be drilled through the main axial bore in the rotor, but the passage 144 is drilled radially from the outer surface of the rotor 132 through the bore 146 and its outer portion is then sealed by a screwed plug 148. The bores 146 and 147 support for axial sliding respective nylon plungers 149 and 150 which are provided with axial bores 151 and 152 and are urged into sealing engagement with the wear plate 129 by compression coil springs 253. Due to the compressed air applied to the supply lines 71 and 93, compressed air will also be acting on the under faces of the nylon plungers 149 and 150 thereby exerting a supplemental force urging them into sealing engagement with the wear plate 129.

The bore 151 in the plunger 149 is at the same radius as a first circular series of ports 153 which are formed through the wear plate 129, the gasket 131 and the nonrotary casing 124, and communicate with various control lines such as the control line 13 shown in FIGS. 1 and 2. Although only one of the ports 153 is shown in the drawings, the remaining ports in the first circular series are identical in form, and radiate from the nonrotary casing 124 for connection to respective control lines. On the other hand, the bore 152 in the plunger 150 is at the same radius as a second circular series of ports 154 which extend through the wear plate 129, the gasket 131 and the nonrotary casing 124 where they spigotally coact with tubes 155 which are brazed in position. As shown in FIG. 2 there are twenty of the tubes 155 leading from the equispaced ports 154 of the second series and the single control line 13 from the ports 153 that has been shown is staggered relatively to the tubes 155—however the first series also has twenty ports 153 which are equispaced and staggered relatively to the second series of ports 154.

The bores 146 and 147 in the rotor 132 are so positioned that whenever the axial bore 151 in the nylon plunger 149 communicates with a selected one of the first series of ports 153, the axial bore 152 in the nylon plunger 150 will communicate with a corresponding one of the second series of ports 154. The rotor 132 is indexed to select the appropriate ports 153 and 154 by means of a ratchet 90 which is held fast with the rotor 132 by a bolt 156 and is indexed by a coacting pawl 89. The latter is pivoted by a rivet 157 to a clevis 158 formed at the end of the connecting rod 88 as will be seen from FIGS. 2 and 3. The other end of the connecting rod 88 is secured to the piston 87 which coacts with the cylinder 81 and is provided with a peripheral double acting sealing ring 159, and a further sealing ring 160 is arranged around the connecting rod 88 intermediate the piston 87 and the clevis 158. The cylinder body 81 is secured to the underside of the bracket 126 by means of two screws 161 and a positioning dowel 162, and the bore in which the piston 87 works is sealed by an end plate 163 which is held in place by four screws 164 (only two of which can be seen in FIG. 3) and serves as a connecting member for a line 83. So that the indexing movement of the pawl 89 can be regulated, a plate 165 is secured to the cylinder body 81 by a screw 166 and carries an adjustable screwed stop 167 for limiting the travel of the pawl 89 during its indexing stroke. Another line 80 is secured to the cylinder body 81 at the opposite end of the piston 87 to the line 83, and the lines 80 and 83 are for alternative connection to a compressed air supply and an exhaust by means of an unshown five port spool valve for causing the piston 87 to reciprocate so that the pawl 89 will index the ratchet 90. For instance, as disclosed in our aforesaid Patent Application, the unshown five port spool valve may have its valve spool biased by a spring to a position in which the line 80 is connected to the compressed air supply and the line 83 is connected to the exhaust so that the piston 87 is moved to the position shown in FIG. 3 so that the pawl 89 is cocked for the next indexing stroke. A compressed air signal applied to the valve spool in opposition to the spring may be arranged to move the valve spool to a position in which the connections to lines 80 and 83 are reversed thereby causing the piston 87 to move the pawl 89 to index the rotor 132 to its next position. In the event that either the first series of ports 153 or the second series of ports 154 are to be connected to sensing means, such as detector holes, which when actuated produce a back pressure signal, the corresponding air supply line 93 or 71 as appropriate would be supplied through a restricting orifice and would be connected to the said five port spool valve so that, whenever a back pressure signal occurred, the five port spool valve would be operated to cause the pawl 89 to index the rotor 132. In this manner the sensing means could be used to detect when the next machine element in a predetermined sequence is to be operated, and the indexing movement of the rotor 132 can be utilized to initiate the operation of the said machine element.

With reference to FIGS. 1 and 2 it will be seen that the nonrotary member 124 is formed with an aperture 168 which leads through a corresponding aperture in the gasket 131 and an aperture 169 in the wear plate 129 to the top surface of the rotor 132. The latter is provided with a setting index 1 in a particular significant position such that, when this index can be viewed through the apertures 168 and 169, a plate 170 secured to the top face of the nonrotary member 124 by a pair of screws 171 and also bearing the index 1 indicates with a pointer 172, as shown in FIG. 2, the port 154 that is connected to the radial rotor passage 145, and with a pointer 173 the port 153 that is connected to the radial rotor passage 144. A further pointer 174 defined by the plate 170 indicates the direction in which the rotor 132 is driven by the pawl 89 and the ratchet 90.

Figure 4:
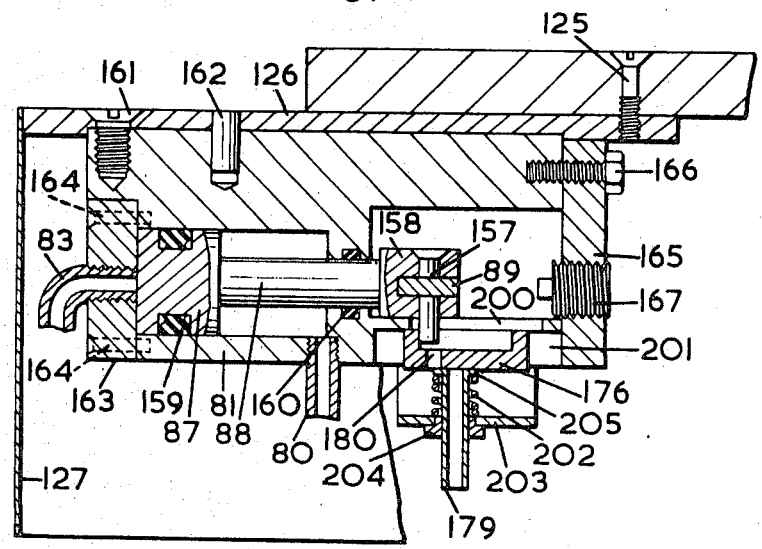
FIG. 4 is similar to FIG. 3 but illustrates a modified construction.

Although FIG. 2 shows that there are twenty ports in each of the first and second series 153 and 154, the number of ports can be readily varied to suit requirements provided the number of ratchet teeth are similarly altered. However it is impracticable, from the manufacturing point of view, to provide a series of valves having only one port difference and it would therefore be advisable to produce a series of valves in which the members of ports vary in increments of, say, five or 10 ports. In use any redundant ports can be blanked off and the indexing pawl 89 could be arranged to repeat index past such redundant ports in any desired manner, for instance in the manner taught in our aforesaid Patent Application. However a preferred construction is illustrated in FIG. 4 in which repeat indexing is achieved by extending the rivet 157 through a slot 200 in the cylinder to operate as slide valve 176 which is biased into a slot 201 formed in the cylinder 81 by means of a compression coil spring 202 reacting against a bracket 203 secured to the cylinder 81. A line 179 extends through a sleeve 204 supported by the bracket 203, and also extends coaxially through the spring 202 which engages a radial flange 205 formed integral with the line 179 thereby ensuring a good sealing contact between the flange 205 and the slide valve 176.

The basic difficulty encountered with repeat indexing the rotor 132 past blanked-off ports 153 or 154, is that the pressure signal, received by the aforesaid unshown five port spool valve when a detector hole (or some other sensing means) is actuated, will cause the piston 87 to effect an indexing stroke of the pawl 89 which then causes the rotor 132 to be indexed to a position in which the radial passage 138 or 140, as the case may be, is connected to a blanked-off detector hole. Thus the pressure signal will remain applied to the five port spool valve, and the piston 87 will not be returned to the position shown in FIG. 4 to recock the pawl 89 unless the initial pressure signal is exhausted. With the construction taught in FIG.

4 this is achieved by connecting the line 179 to the line which delivers the pressure signal to the five port spool valve. Accordingly the application of a fluid pressure signal to the five port spool valve first connects the line 83 to the compressed air supply and the line 80 to exhaust so that an indexing stroke of the piston 87 will be effected, and the movement of the piston 87 to operate the pawl 89 causes the rivet 157 to move relatively to the slide valve 176 until the lost motion is taken up towards the end of the piston stroke and the slide valve 176 is moved to connect the line 179 to exhaust through the then aligned port 180 thereby exhausting the initial pressure signal. The spring in the five port spool valve then reverses the connections to the lines 80 and 83 so that the piston 87 recocks the pawl 89 before the next pressure signal is received by the five port spool valve.

With this arrangement it will be appreciated that if all of the ports 153 or 154 are blocked off and the corresponding supply line 93 or 71 is connected to operate the five port spool valve, the rotor 132 will be rotated continuously and forms a type of air motor. However the rotation would not be smooth due to the action of the pawl 89, and the rotor 132 would be rotated continuously in increments—with the twenty-ported arrangement illustrated, each increment would be of 18°.

The capacity of the fluid distribution valve for repeat indexing and continuous rotation is of great value for the purposes of automatic selection as taught in our aforesaid Patent Application.

Although the nonrotary member 124 and its associated wear plate 129 are arranged to abut one axial end of the rotor 132, they could be arranged annularly about the rotor 132 if so desired.

Although the fluid distribution valve disclosed is particularly useful in connection with our aforesaid Patent Application Ser. No. 841,080 it will be appreciated by those skilled in the art that it could be applied in a great variety of ways in fluid circuits whether pneumatic or liquid-operated, and that its feedback characteristics are particularly useful in economizing in the number of valves utilized in a control circuit.

It should also be appreciated that, although the air supply lines 71 and 93 have been described as fulfilling the role of compressed air supply lines so that these supplies will be selectively distributed to the ports 153 and 154 in a desired sequence, these functions could be reversed if so desired. Moreover, although the indexing piston 87 is preferably operated in the manner taught in our aforesaid Patent Application, it could be operated in a desired manner.

We claim:
1. A fluid distribution valve, comprising:
a spindle;
a rotor supported by the spindle;
a first passage defined by the spindle;
a first annular gallery defined between the spindle and the rotor and communicating with said first passage;
a second passage defined by the spindle;
a second annular gallery defined between the spindle and the rotor, axially spaced from the first annular gallery and communicating with said second passage;
sealing means arranged to inhibit the leakage of fluid from the two annular galleries between the rotor and the spindle;
a nonrotary member supporting said spindle;
a first and a second series of spaced ports defined by said nonrotary member;
a first passage defined by the rotor and communicating between the first annular gallery and any selected port of the first series;
a second passage defined by the rotor and communicating between the second annular gallery and any selected port of the second series;
further sealing means arranged operatively between the rotor and the nonrotary member for inhibiting fluid leakage from the first and second rotor passages between the rotor and nonrotary member; and
indexing means for rotating the rotor relative to the nonrotary member in angular increments for connecting the first and second spindle passages respectively to different ports in the first and second series.

2. A fluid distribution valve according to claim 1 in which a face defined by the nonrotary member is formed normal to the rotational axis of the rotor, the first and second series of spaced ports are formed in the face of the nonrotary member such that each series is arranged around a notional circle of different diameter struck about the rotational axis of the rotor, the rotor has a face corresponding with the face of the nonrotary member, said first and second rotor passages lead to the face of the rotor at radial positions corresponding respectively with the first and second series of ports, and the further sealing means is carried by the rotor and is biased into sealing engagement with the face of the nonrotary member.

3. A fluid distribution valve, according to claim 2, in which the further sealing means includes an annular sealing plug for each of the first and second rotor passages, and each annular sealing plug has its external cylindrical surface sealingly supported from the rotor for axial movement towards the face of the nonrotary member, and each of the rotor passages is arranged to communicate through its respective annular sealing plug with the selected port of the corresponding series such that the prevailing fluid pressure will act on the annular face of the annular sealing plug that is remote from the nonrotary member whereby to urge the annular sealing plug into sealing engagement with the face of the nonrotary member.

4. A fluid distribution valve according to claim 2 in which the further sealing means includes an annular sealing plug for each of the first and second rotor passages, and each annular sealing plug is sealingly supported from the rotor for axial movement towards the face of the nonrotary member, and each of the rotor passages is arranged to communicate through its respective annular sealing plug with the selected port of the corresponding series, and in which spring means are arranged to react between the rotor and the annular sealing plugs to urge the annular sealing plugs into sealing engagement with the face of the nonrotary member.

5. A fluid distribution valve according to claim 2 in which spring means is arranged to urge the rotor axially into engagement with the face of the nonrotary member.

6. A fluid distribution valve according to claim 1 in which the first and second spindle passages are defined to respective axial bores formed from opposite ends of the spindle.

7. A fluid distribution valve, according to claim 1, in which an aperture is formed through the nonrotary member in a significant position relatively to the first and second series of ports such that a different portion of an annular zone of the rotor will be visible through the aperture according to the indexed position of the rotor, and the annular zone of the rotor is marked in at least one significant position relatively to the first and second rotor passages.

8. A fluid distribution valve, according to claim 1, in which a ratchet is rotatively fast with the rotor for moving the rotor through its indexed positions, a pawl is arranged for indexing the ratchet, a fluid-operable actuator is arranged for reciprocating the pawl such that each reciprocation will provide one indexing movement and the fluid-operable actuator is arranged to reciprocate the pawl whenever a fluid pressure signal is delivered to the first spindle passage from a selected port in the first series.

9. A fluid-distribution valve, according to claim 8, in which said first spindle passage communicates with a fluid pressure source through a restrictor means and said first series of ports are connected to respective sensing means which, when actuated whilst connected by said first rotor passage to said first spindle passage, will produce said fluid pressure signal.

10. A fluid-distribution valve, according to claim 9, in which at least one of the ports in said first series is connected to a sensing means which is already actuated when the first rotor passage is connected to it whereby the fluid pressure signal produced by it merges with and cannot be distinguished from the preceding fluid pressure signal which caused the rotor to be indexed to the position in which the first rotor passage was connected to the said one port, and the indexing action of the fluid-operable actuator is arranged to operate valve means to cause an interruption between said preceding fluid pressure signal and the fluid pressure signal produced by the sensing means connected to said one port whereby these signals will be distinctly separated so that the fluid-operable actuator will repeat index the rotor as soon as the first rotor passage is connected to said one port.